Patented Apr. 23, 1940

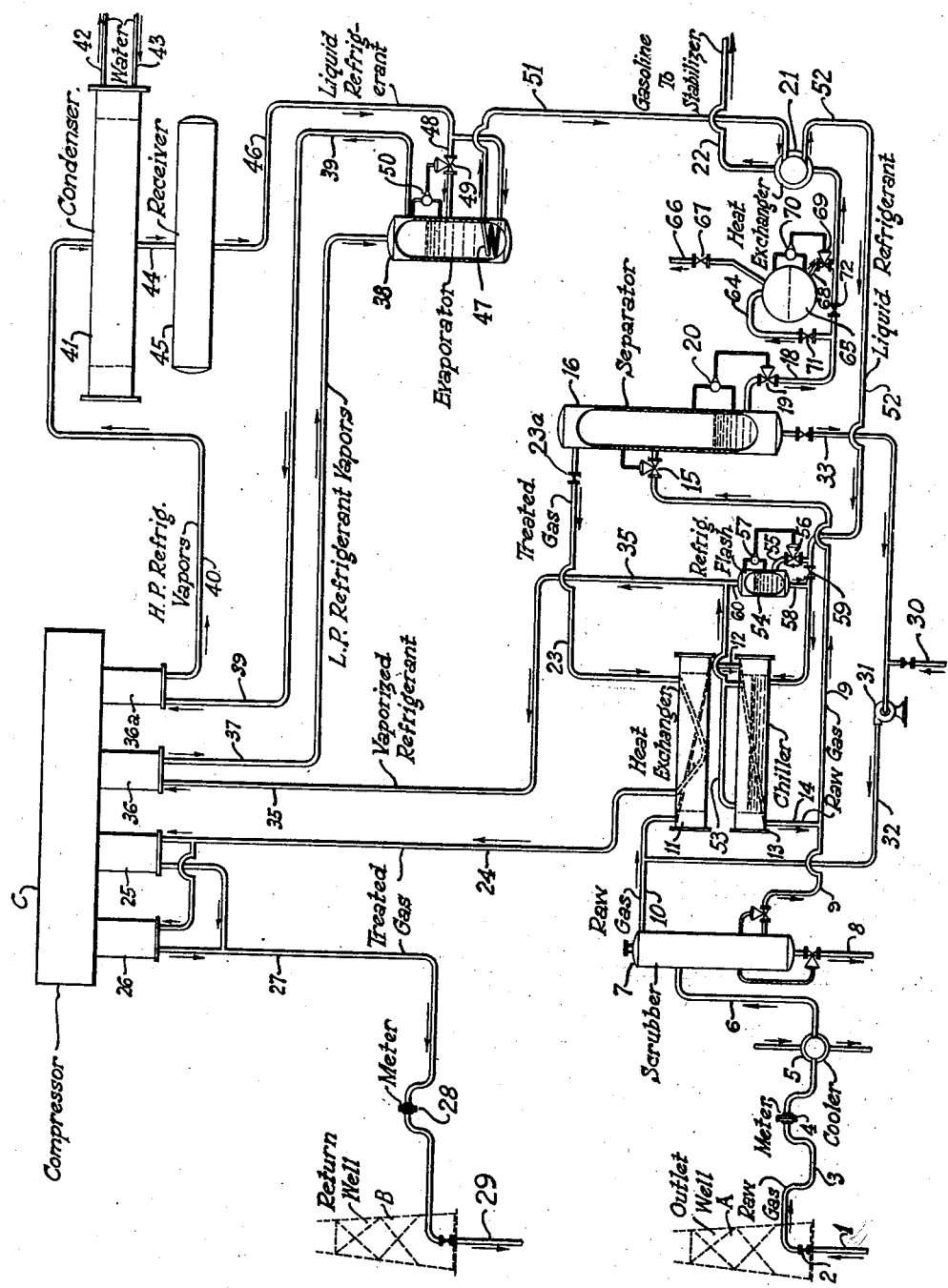

2,198,098

UNITED STATES PATENT OFFICE 2,198,098

HIGH PRESSURE GAS PROCESS

William H. Vaughan, Palestine, Tex., assignor to Tide Water Associated Oil Company, Tulsa, Okla., a corporation of Delaware and Seaboard Oil Company of Delaware, Dallas, Tex., a corporation of Delaware, jointly Application February 6, 1939, Serial No. 254,747

14 Claims. (Cl. 62—175.5)

This invention relates to improvements in methods of recovering desirable liquefiable constituents from high pressure gas such as natural gas.

In my Patent Number 2,133,774, issued October 18, 1938, there was disclosed a method for recovering desirable liquefiable constituents from natural gas which was initially available at high pressures within the retrograde condensation range of such constituents, that is, a range of pressures wherein reduction of pressure within such range was essential to effect condensation of the desired constituents. This step of limited pressure reduction in combination with the step of cooling the gas to a suitable temperature, dependent upon the composition of the gas and the pressure employed, produced an efficient recovery of the desirable liquefiable constituents while enabling the maintenance of the pressure of the gas as close as possible to its initial pressure, thereby conserving to a maximum degree the initial pressure energy of the gas, to thus render the gas available, among other uses, for return to the producing formation by economic process methods.

The cooling step employed in conjunction with the pressure reduction step, in the aforementioned patented method, may, and ordinarily does, consist of stage cooling of the gas by one or more different cooling mediums. Ordinarily, artificial refrigeration is employed in at least one of these cooling stages. Among the artificial refrigerants ordinarily employed may be mentioned expanded liquid ammonia, propane or similar hydrocarbon refrigerant, and others of the type which produce sufficient refrigeration for the purposes of the process by the expansion of such refrigerants from liquid to gaseous phase.

The employment of such a refrigeration step involves the use of the more or less conventional refrigeration cycle of expansion of the refrigerant to a vapor, compression of the vapor and condensation thereof to a liquid and re-expansion of the liquid to vapor. The present invention is directed to improvements in the recovery of the desirable constituents from the gas by providing improvements in the manner in which such refrigeration cycle is combined with steps for recovering the desirable constituents from the gas, and by providing related improvements in the refrigeration cycle itself. These improvements to be presently described in detail, result in greatly increased over-all efficiency for the recovery process, and particularly in substantial reduction in the horse power required for the refrigeration cycle, with the further result that where the residue gas is to be recompressed for recycling to the producing formation, a larger proportion of the total available horsepower of any unit power plant employed in the process, will be released for use in recompression of the residue gas and will thereby increase the gas through-put capacity of the plant.

Therefore, a principal object of this invention is to provide an improved process for recovering desirable liquefiable constituents from high pressure gas.

Another object is to provide an improved process for recovering desirable liquefiable constituents from high pressure gas with a minimum reduction in the initial pressure of the gas.

A further object is to efficiently recover desirable liquefiable constituents from high pressure gas by cooling the gas to a suitable condensing temperature for such constituents while reducing the pressure only a minimum amount as represented by the retrograde condensation range of such constituents.

An additional object is to provide an improved method for recovering desirable liquefiable constituents from high pressure gas in the course of recycling the gas to the producing formation.

Another object is to provide improvements in the cooling steps employed in effecting the recovery of desirable liquefiable constituents from high pressure gas which is returned to sub-surface reservoirs.

Still another object is to reduce the total power requirements of the cooling steps employed in recovering desirable liquefiable constituents from high pressure gas to thereby increase the amount of power available for recompression of the gas returned to sub-surface reservoirs.

Other important and more specific objects and advantages of this invention will become readily apparent from the following detailed description taken in conjunction with the accompanying drawing which illustrates diagrammatically the flow arrangement of the process of this invention.

Referring to the drawing, A represents a well having a flow pipe 1 leading to a sub-surface gas reservoir, not shown, from which gas, normally under very high pressure, is drawn through pipe 1 under the control of a valve 2 and discharged through a pipe 3, in which a meter 4 is interposed, and thence through a cooler 5, where the gas is cooled partially, preferably by water, and thence by a pipe 6 into a scrubber 7, wherein any liquid constituents and water, condensed by the cooling in cooler 5, are separated from the gas. Scrubber 7 is provided with a valved drain pipe 8 communicating with the bottom thereof for draining-off water, and is also provided with a valved pipe 9 connected to an intermediate portion thereof for discharging any separated hydrocarbon constituents from the scrubber to later portions of the process, as will be pointed out hereinafter. The raw gas separated from liquid constituents and water in scrubber 7 is discharged from the top thereof under its own pressure through a pipe 10 through the tubes of a tube-and-shell heat exchanger 11, thence by a pipe 12 through the tubes of a tube-and-shell type chiller 13, whence it passes through a pipe 14 into pipe 9 where it is mixed with the hydrocarbon liquid discharged from scrubber 7, as described, and the mixture is then conducted through a pressure reducing valve 15 into a separator 16. In its passage through cooler 5, heat exchanger 11 and chiller 13 the raw gas is cooled to a relatively low temperature by suitable cooling mediums, to be described in greater detail hereinafter, and upon a partial release of the pressure of the gas through valve 15 and its consequent expansion into separator 16, the gas is further cooled to the final desired temperature at which condensation of the desired gas constituents takes place in separator 16. The condensed constituents, which are at the low temperature produced in separator 16 by the aforementioned cooling steps and which thereupon collect in the lower portion of separator 16, are discharged therefrom under the pressure maintained in the separator, through a pipe 18, in which is mounted a valve 19 under the control of a liquid level controller 20, and passed through the shell of a shell-and-tube heat exchanger 21, where the low temperature of the condensed gas constituents is utilized for cooling a refrigerant liquid to be described later, and thence through a pipe 22 to a suitable stabilizer system, not shown, or to other means of treatment and disposal of the recovered constituents.

Before passing the condensed constituents through heat exchanger 21, they may be partially stabilized by flashing to a lower pressure than that under which they were condensed. This is accomplished by by-passing the condensed constituents from pipe 18 through a pipe 64 which leads into a flash tank 65 which is provided with a vapor vent pipe 66 equipped with a pressure release valve 67. By suitable manipulation of valve 67, the pressure on the condensed constituents may be reduced from that existing in separator 16 to a substantially lower pressure, with the result that the lighter portions of the constituents, which are normally gaseous at the lower pressure, will vaporize and separate from the heavier constituents in flash chamber 65. The flashed vapors are discharged from chamber 65 through vent pipe 66 and are sent to the plant fuel system, not shown, or to a lower pressure absorption type gasoline recovery plant, not shown. The unvaporized constituents are then discharged from chamber 65 through a pipe 68, having a control valve 69 therein under the control of a liquid level controller 70 mounted on the side of chamber 65, and are re-introduced into pipe 18 whence they are conducted to exchanger 21, as above described. Valves 71 and 72 are suitably positioned in pipes 64 and 18, respectively, to permit the routing of the condensed constituents either directly to exchanger 21 or by way of flash chamber 65 to exchanger 21 as may be desired. In partially flashing the condensed constituents in flash chamber 65 as described, the temperature of the unvaporized constituents returned to pipe 18 will be further lowered as a result of the refrigeration effect of the expansion, by pressure reduction, in flash chamber 65, and the condensed constituents will therefore provide an increased amount of refrigeration in heat exchanger 21 for the purposes to be more fully described hereinafter.

The residue gas, separated from condensed constituents in separator 16, is discharged from the upper portion thereof through a pipe 23, in which is mounted a valve 23a, which conducts the gas, cooled to a low temperature as a result of the aforementioned cooling and expansion steps, to the shell of heat exchanger 11, wherein the cold gas exchanges heat with the incoming raw gas and serves to partially cool same as previously noted. The residue gas leaves heat exchanger 11 through a pipe 24 which conducts the gas to a low-stage cylinder 25 of a multi-stage compressor C which compresses the residue gas, preferably through a second and higher stage cylinder 26 to a higher pressure sufficient to permit the gas to be recycled to the sub-surface reservoir from which it came and to which it is returned through a pipe 27 and meter 28 to the flow pipe 29 of a return well B. Instead of recycling the residue gas to its source reservoir, it may be employed for repressuring lower pressure oil reservoirs, for which purpose re-compression of the gas may be avoided, if the pressure in the oil formation is lower than the pressure to which the residue gas is reduced in recovering the gasoline constituents therefrom, or the residue gas may be utilized for any other purpose for which high pressure gas may be useful or desirable.

It will be understood that by the term recycling, as used above, is meant the return of the gas to the reservoir from which it came in order to conserve to as great an extent as possible the natural pressure and volume of gas originally in the reservoir, and in order to permit the return gas to pick up additional quantities of liquefiable constituents present in the reservoir. In this way the gas recycled to the reservoir serves as continuously moving vehicle to pick up desirable constituents from the reservoir, carry them to the surface where they are recovered by the presently described process, and return to the reservoir for an additional supply of the desired constituents.

The foregoing describes in more or less generalized terms the steps for recovering desirable liquefiable constituents from the gas. To further aid in improving the efficiency of this process, a dehydrating agent may be circulated in the system to remove water vapor from the gas and to inhibit hydrocarbon-hydrate formation in the system. For this purpose a suitable dehydrating agent, such as concentrated solution of calcium chloride, is drawn from a suitable source of supply, not shown, through a valved pipe 30 by a pump 31 and discharged through a pipe 32 into pipe 10, where the dehydrating agent is injected directly into intimate mixture with the raw gas prior to its passage through heat exchanger 11 and chiller 13. The dehydrating agent, being immiscible with the gas and with the condensed constituents, collects in the lower portion of separator 16 beneath the body of condensed constituents and is withdrawn therefrom through a valved pipe 33 and enters pipe 30, whence it is re-circulated through the system by means of pump 31. This step of dehydration of the gas was described in greater detail in my co-pending application, Serial Number 224,471, filed August August 12, 1938.

The foregoing process is applied preferably to natural gas which is available at the discharge from well A at pressures ranging from above about 700 pounds per square inch to about 5000 lbs. per sq. in. or more, and which contains desirable liquefiable constituents, in vapor state in the gas, primarily by virtue of the retrograde condensation (vaporization) effect at such pressures, and of the temperature of the gas, which may range from 80 to 90° F. to above 125° F., depending upon the temperature in the sub-surface reservoir and the rate at which the gas is withdrawn from the well.

As disclosed in the aforementioned Patent No. 2,133,774, the condensation of the desirable liquefiable constituents, which consist ordinarily of propane, butanes, pentanes and heavier hydrocarbons, is effected by cooling the gas to a suitable condensation temperature while reducing the pressure substantially only within the retrograde condensation range of these constituents. In the present case, the initial pressure of the gas, as regulated by means of valve 2, is substantially maintained throughout the recovery system, except for friction losses, up to the point of pressure release through release valve 15. Thus the cooling steps conducted in cooler 5, heat exchanger 11 and chiller 13 are conducted at substantially the initial pressure of the gas. Thereafter, the pressure is reduced through valve 15 a relatively small amount which is substantially only within the retrograde condensation range of the desired constituents and not below about 700 lbs. per sq. in. The resulting expansion of the gas in separator 16 produces additional cooling of the gas which is sufficient to reduce the temperature thereof to the desired final temperature suitable to condense substantially all of the desired liquefiable constituents original contained in the gas. The final temperature to which the gas is thus cooled ranges generally from about −5° to +40° F., but may be lower or higher, depending upon the composition of the gas and upon the pressures employed.

The amount of pressure reduction is limited, as noted above, to an amount which is within the retrograde condensation range of the desired constituents at the temperature employed, but the lower limit of the pressure reduction is generally above about 700 lbs. per sq. in., and is kept at a minimum in order that as much as possible of the initial pressure energy of the gas may be conserved to thereby keep at a minimum the amount of power required for compressor C in re-compressing the gas for return to its source reservoir. In some cases a pressure reduction of only two or three hundred pounds per sq. in. is sufficient, in conjunction with the temperatures employed, to condense the desired constituents. For example, in one case, the gas leaving well A was at a pressure of about 1500 lbs. per sq. in. and at a temperature of about 100° F. This gas was cooled to a temperature of about 0° F. by water cooling in cooler 5, by heat exchange in heat exchanger 11 with the residue gas from separator 16, by chilling in chiller 13 by exchange with expanded ammonia, and by the refrigeration effect produced by the reduction in pressure of the gas through valve 15 from the initial pressure of 1500 lbs. per sq. in. to a final pressure of about 1250 lbs. per sq. in., and as a result, about 90% of the desirable constituents originally contained in the raw gas were condensed in separator 16. In another case, the pressure was reduced from about 2300 lbs. per sq. in. to about 1300 lbs. per sq. in. and cooled, as above described, to a temperature of about 0° F. to recover about 90% of the desired constituents originally present in the gas. In every case, however, the pressure reduction did not extend below the retrograde condensation range of the constituents, and as a result, the power required for recompression was held to a minimum.

In both the above examples, the temperature of the condensed constituents leaving separator 16 was about 0° F. at which temperature it reached heat exchanger 21 when sent directly thereto. However, when the condensed constituents were subjected to the partial flashing operation in flash chamber 65, the finally unvaporized material which proceeded to heat exchanger 21 was at a temperature of from 5 to 10° F. lower than that of the condensed constituents entering flash chamber 65.

To provide further improvements in the efficiency of the described recovery operation, this invention, as previously noted, provides novel improvements in the refrigeration cycle employed particularly with the cooling step conducted in chiller 13 as will be described hereinafter.

Refrigerant vapors, such as ammonia vapors resulting from the expansion of liquid ammonia in cooling the raw gas in chiller 13, are drawn through a pipe 35 into a low stage cylinder 36 of compressor C and are partially compressed therein and discharged through a pipe 37 into an evaporator 38 where the partially compressed ammonia vapors are mixed with other ammonia vapors produced by the expansion of liquid ammonia introduced into evaporator 38 as will be presently described. The expanded ammonia vapors are, of course, at a relatively low temperature compared with that of the partially compressed vapors entering the evaporator from pipe 37 and reduce the temperature of the latter. The cooled mixture of ammonia vapors then passes from evaporator 38 through a pipe 39 into a second and higher stage cylinder 36a of compressor C and is there compressed to the final desired pressure necessary to produce liquefaction of the ammonia vapors when suitable cooling is applied thereto. The finally compressed ammonia vapor is discharged from cylinder 36a through a pipe 40 through the shell of a tube-and-shell type condenser 41, where the vapor is condensed to liquid ammonia by cooling with cold water circulated through the tubes of the condenser by means of pipes 42 and 43, and the liquid ammonia is discharged under the pressure applied by compressor C through a pipe 44 into a receiver 45 from which the liquid ammonia is discharged through a pipe 46 and through a closed coil 47 which is mounted within the lower portion of evaporator 38. A portion of the liquid ammonia from pipe 46 is by-passed directly into evaporator 38 through a pipe 48 having a valve 49 therein under the control of a liquid level controller 50, which is mounted on the side of evaporator 38. The liquid ammonia thus discharged into evaporator 38 expands to vapor due to the lower pressure in the evaporator, and in expanding, produces refrigeration which cools the resulting vapors which then mix with the partially compressed ammonia vapors from pipe 37, as above described. Only a portion of the liquid ammonia is thus evaporated, the unvaporized portion forming a body of liquid ammonia, which is at a relatively low temperature due to its partial evaporation. This body of cold ammonia liquor surrounds the coil 47 and further cools the liquid ammonia passing through the coil from pipe 46. The chilled liquid ammonia passes from coil 47 into a pipe 51 which conducts the liquid through the tubes of heat exchanger 21 where it is further chilled to a very low temperature by interchange with the cold condensed gas constituents passing through the shell of the exchanger from separator 16 as above described. Since, as noted above, the final condensation of the desired gas constituents is effected in separator 16 at temperatures of from —5° F. to +40° F. and generally at about 0° F. to +10° F., and may be further cooled by flashing in flash chamber 65, the condensed constituents will be at such a low temperature and ordinarily of sufficiently large volume to chill the liquid ammonia passing through exchanger 21 to a temperature which approaches very close to the temperature of the condensed gas constituents. The liquid ammonia, thus chilled, passes from exchanger 21 through a pipe 52 into the shell of chiller 13, where it is allowed to expand, further reducing its temperature, and thereby chilling the raw gas passing through the chiller tubes en route to separator 16. The expanded ammonia vapors pass from chiller 13 through a header 53 into pipe 35 through which the vapors return to low pressure cylinder 36 of compressor C, as previously described, for recompression and recycling through the described refrigeration cycle.

As an additional improvement in chilling the raw gas passing through chiller 13, it is found advantageous to expand the liquid ammonia just prior to entering the chiller and to thereby cool the liquid ammonia, while it is outside the chiller, to the low temperature desired, and to introduce the thus chilled ammonia liquid into contact with the tubes of the chiller through which the raw gas is flowing. In this way, liquid-to-raw gas heat exchange is effected, which is more efficient than that of ammonia vapor-to-raw gas, particularly since the latter, under the very high pressures employed, exhibits substantially the heat exchange characteristics of a liquid.

The apparatus for accomplishing this further improvement consists of a refrigerant flash chamber 54 mounted at the side of chiller 13 and connected to pipe 52 by means of a by-pass pipe 55, having a valve 56 therein under the control of a liquid level controller 57 mounted on the side of chamber 54. Pipe 55 enters chamber 54 at a point intermediate its upper and lower ends. An equalizing pipe 58 leads from the lower portion of chamber 54 back into pipe 52 at a point between chiller 13 and the point of connection of pipe 55. A valve 59 is mounted in pipe 52 between pipes 58 and 55. Liquid ammonia is introduced into chamber 54 through pipe 55° and partially expanded therein sufficiently to cool the remaining unexpanded liquid ammonia to the desired chilling temperature. A level of liquid ammonia is maintained sufficiently high in chamber 54 by means of controller 57 so that a level of liquid ammonia may be maintained in chiller 13 sufficient to cover the tubes thereof. The levels of liquid ammonia in chamber 54 and chiller 13 are equalized and maintained through equalizing pipe 58 and pipe 52. The ammonia vapors produced by the expansion in chamber 54 are separated from the liquid and discharged therefrom through a pipe 60 which connects into pipe 35.

The bulk of the ammonia vapors will be produced in chamber 54, although some vapors will also be produced in chiller 13 by the heating of the liquid ammonia by the relatively warmer raw gas passing through the chiller. These latter ammonia vapors will, as previously described, leave the shell of chiller 13 through header 53, whence they will be discharged into pipe 35.

It will be understood, of course, that instead of using ammonia as the particular refrigerant in the above process, other refrigerants such as propane or the like, which are characterized by their ability to produce sufficient refrigeration by their change of state from a liquid to a gas, may be used.

The temperatures and pressures employed in the refrigeration cycle, in connection with the examples of the gas treating operation given above, are substantially as follows: The ammonia vapors produced by the expansion of the liquid ammonia in the refrigerant flash chamber 54 and chiller 13 and passing through pipe 35 to cylinder 36 will be at a pressure of from 5 to 10 lbs. per sq. in. and at a temperature of about +10° F. These vapors will be compressed in cylinder 36 and discharged into pipe 37 at a pressure of about 50 lbs. per sq. in. and at a temperature of about 110° F., under which conditions the partially compressed vapors enter evaporator 37 and are there mixed with sufficient expanded ammonia vapors to reduce the temperature of the mixture passing through pipe 39 to about 40° F. The cooled mixture of ammonia vapors is then compressed to a pressure of about 190 lbs. per sq. in. in cylinder 36a and discharged through condenser 41, where the vapors are condensed at a temperature of about 90° F. The liquid ammonia then passes through coil 47 where the temperature is reduced to about 40° F. by heat exchange with cooled ammonia liquor and then to about 10° F. in heat exchanger 21 by heat exchange with the cold condensed gas constituents passing therethrough. The final expansion of the liquid ammonia in chamber 54 and chiller 13 from 190 lbs. per sq. in. to 5 to 10 lbs. per sq. in. further reduces its temperature to about —15° F., which is sufficient to cool the raw gas to the desired temperature for condensing the desirable gas constituents.

By the described heat interchange and expansion steps in the refrigeration cycle itself, and by the described heat interchange of the refrigerant with the gas constituents, very substantial savings are effected in the power required, both in the refrigeration cycle and in the recycling of the gas. Such savings range from about 2 to 5 horsepower per million cubic feet of gas processed per day.

The described improvements are particularly advantageous where multi-cylinder compressors are employed in which some of the cylinders handle the refrigerant and the others handle the gas being returned to sub-surface reservoirs. Such compressors are generally supplied with mechanism for distributing the power load among the cylinders in almost any desired proportions. Thus, in a compressor unit rated at 500 horsepower, the refrigeration cycle of the above examples may normally require 200 horsepower, leaving 300 horsepower available for compressing gas. When any savings are effected in the power required in the refrigeration cycle, these savings are immediately reflected in increased capacity in the gas compression end of the compressor, thereby correspondingly increasing the capacity of the gas processing plant. It will be evident, therefore, that the process of this invention provides a highly efficient process for recovering desirable liquefiable constituents from high pressure gas, while maintaining the gas as closely as possible to its initial pressure.

Various modifications and alterations may be made in the described process steps and in the temperatures and pressures employed without departing from the scope of the appended claims.

What I claim and desire to secure by Letters Patent is:

1. The process of recovering desirable liquefiable constituents from gas which is initially at a high pressure within the retrograde condensation range of said constituents which comprises, cooling said gas sufficiently to condense said constituents while said gas is maintained under substantially said high pressure, thereafter reducing said high pressure substantially only within said retrograde condensation range of said constituents at the reduced temperature, separating the resulting condensed constituents from uncondensed gas, and accomplishing the aforesaid cooling at least in part by artificial refrigeration, said artificial refrigeration comprising passing a refrigerant of the liquefied gas type first in indirect heat exchange relationship with said condensed constituents to chill the refrigerant, and thereafter expanding the chilled refrigerant in indirect heat exchange relationship with said high pressure gas prior to the reduction in pressure thereof.

2. A process according to claim 1, wherein said refrigerant is ammonia.

3. The process of recovering desirable liquefiable constituents from gas which is initially at a high pressure within the retrograde condensation range of said constituents which comprises, cooling said gas to a temperature of from about −5° F. to about +40° F. while said gas is maintained under substantially said high pressure, thereafter reducing said high pressure substantially only within the retrograde condensation range of said constituents at the reduced temperature, separating the resulting condensed constituents from uncondensed gas, and accomplishing the aforesaid cooling at least in part by artificial refrigeration, said artificial refrigeration comprising passing a refrigerant of the liquefied gas type first in indirect heat exchange relationship with said condensed constituents to chill said refrigerant, and thereafter expanding the chilled refrigerant in indirect heat exchange relationship with said high pressure gas prior to the reduction in pressure thereof.

4. The process of recovering desirable liquefiable constituents from gas which is initially at a high pressure above about 100 pounds per sq. in. which comprises, cooling said gas to a temperature of from about −5° F. to about +40° F., reducing the initial pressure of the gas substantially only within the retrograde condensation range of said constituents but not below about 700 lbs. per sq. in., separating the resulting condensed constituents from uncondensed gas, and accomplishing the aforesaid cooling at least in part by artificial refrigeration, said artificial refrigeration comprising passing a refrigerant of the liquefied gas type first in indirect heat exchange relationship with said condensed constituents to chill said refrigerant, and then expanding the chilled refrigerant in indirect heat exchange relationship with said high pressure gas prior to the reduction in pressure thereof.

5. The process of recovering desirable liquefiable constituents from gas which is initially at a pressure above about 700 lbs. per sq. in. which comprises, cooling said gas to a temperature of from about −5° F. to about +40° F., reducing the initial pressure of the gas substantially only within the retrograde condensation of said constituents but not below about 700 lbs. per sq. in., separating the condensed constituents from uncondensed gas, and accomplishing the aforesaid cooling of said gas in part by the refrigeration effect produced in the gas by the reduction in pressure thereof and in part by artificial refrigeration, said artificial refrigeration comprising passing a refrigerant of the liquefied gas type first in indirect heat exchange relationship with said condensed constituents to chill the refrigerant, and then expanding the chilled refrigerant in indirect heat exchange relationship with said high pressure gas prior to said reduction in pressure thereof.

6. The process of recovering desirable liquefiable constituents from gas which is initially at a high pressure within the retrograde condensation range of said constituents which comprises, cooling said gas sufficiently to condense said constituents while said gas is maintained under substantially said high pressure, thereafter reducing said high pressure substantially only within said retrograde condensation range of said constituents at the reduced temperature, separating the resulting condensed constituents from uncondensed gas, and accomplishing the aforesaid cooling at least in part by artificial refrigeration, said artificial refrigeration comprising passing a refrigerant of the liquefied gas type first in indirect heat exchange relationship with said condensed constituents to chill the refrigerant, then partially expanding the chilled refrigerant to further cool same, separating the expanded refrigerant into a vapor and a liquid portion, and passing said liquid portion into indirect heat exchange relationship with said high pressure gas prior to the aforesaid reduction in pressure thereof.

7. In the process of recovering liquefiable constituents from high pressure gas wherein the pressure of said gas is reduced while being cooled to a suitable condensing temperature to condense said liquefiable constituents and the resulting condensed constituents separated from uncondensed gas, the improved method of cooling said gas which comprises, passing a liquefied gas refrigerant in indirect heat exchange relationship with said condensed constituents, thereafter expanding said refrigerant in indirect heat exchange relationship with said gas prior to separation of said condensed constituents therefrom, subjecting said expanded refrigerant to multistage compression and condensation to liquefy same, partially flashing some of the liquefied refrigerant between the stages of compression to cool same, and passing the liquefied and cooled refrigerant into the aforesaid indirect heat exchange relationship with said condensed constituents.

8. The process of recovering desirable liquefiable constituents from gas which is initially at a high pressure within the retrograde condensation range of said constituents which comprises, cooling said gas sufficiently to condense said constituents while said gas is maintained under substantially said high pressure, thereafter reducing said high pressure substantially only within said retrograde condensation range of said constituents at the reduced temperature, separating the resulting condensed constituents from uncondensed gas, and accomplishing the aforesaid cooling at least in part by artificial refrigeration, said artificial refrigeration comprising subjecting a refrigerant of the liquefied gas type to expansion from liquid to vapor by reduction in pressure while in indirect heat exchange relationship with said gas prior to the separation of said condensed constituents therefrom, subjecting the expanded refrigerant vapor to multistage compression and condensation to liquefy same, partially evaporating some of the liquefied refrigerant between the stages of compression to cool same, mixing the resulting vapor with that passing from a lower to a higher stage of said compression, passing the remainder of said liquefied refrigerant into indirect heat exchange relationship with the unvaporized portion of the partially flashed refrigerant, thereafter passing said remainder of said liquefied refrigerant into indirect heat exchange relationship with said condensed constituents after the latter have been separated from uncondensed gas, then passing said liquefied refrigerant to the aforesaid expansion in indirect heat exchange relationship with said gas.

9. In the process of recovering liquefiable constituents from high pressure gas wherein the pressure of the gas is partially reduced while being cooled to a suitable temperature to condense said liquefiable constituents, the improved method of cooling said gas which comprises, passing said gas while under said high pressure into indirect heat exchange relationship with an expanding refrigerant of the liquefied gas type to at least partially cool said gas, partially reducing the pressure on said gas to further cool same to the desired condensation temperature for said liquefiable constituents, separating the resulting liquefied constituents from uncondensed gas, passing the cold condensed constituents into indirect heat exchange relationship with said refrigerant prior to the expansion of the refrigerant to further cool same, and passing said uncondensed gas into indirect heat exchange relationship with said high pressure gas prior to the aforesaid heat exchange of said high pressure gas with said expanding refrigerant.

10. In the process of recovering liquefiable constituents from high pressure gas wherein the gas is cooled to a suitable condensing temperature for said constituents while said pressure is reduced and the condensed constituents separated from uncondensed gas, the improvement in the step of cooling said gas which comprises, passing a refrigerant of the liquefied gas type while in liquid phase into indirect heat exchange relationship with said condensed constituents previously separated from the condensed gas, then expanding said refrigerant to vapor while in indirect heat exchange relationship with said high pressure gas, and then re-liquefying said refrigerant by compression and cooling, and recirculating the re-liquefied refrigerant to the aforesaid cooling step.

11. A process according to claim 1 wherein said refrigerant is propane.

12. In a process of recovering desirable liquefiable constituents from high pressure gas wherein the pressure of the gas is partially reduced while being cooled to a suitable condensing temperature to condense said liquefiable constituents, the improvements which comprise, mixing a dehydrating agent with said gas, passing the resulting mixture while under said high pressure into indirect heat exchange relationship with an expanding refrigerant of the liquefied gas type to at least partially cool said mixture, partially reducing the pressure on said gas to further cool same to the desired condensation temperature for said liquefiable constituents, separating the resulting liquefied constituents from said dehydrating agent and said uncondensed gas, passing the cold condensed constituents into indirect heat exchange relationship with said refrigerant prior to the expansion of the refrigerant to further cool same, and passing said uncondensed gas into indirect heat exchange relationship with said high pressure gas prior to the aforesaid heat exchange of said high pressure gas with said expanding refrigerant.

13. In the process of recovering liquefiable constituents from high pressure gas wherein said gas is withdrawn from a high pressure underground source, cooled to a suitable condensing temperature while the pressure is partially reduced, condensed constituents separated from uncondensed gas and said uncondensed gas recompressed to a higher pressure and returned to said underground source, the improvements which comprise, passing a refrigerant of the liquefied gas type while in liquid phase into indirect heat exchange relationship with said separated condensed constituents, then expanding said refrigerant to vapor while in indirect heat exchange relationship with said high pressure gas, then re-liquefying said refrigerant vapor by compression and cooling, and recirculating the re-liquefied refrigerant to the aforesaid cooling step, the power for re-compressing said uncondensed gas and for compressing said refrigerant being proportionally supplied therefor from a common source.

14. Apparatus for recovering liquefiable constituents from gas produced from a high pressure reservoir comprising a conduit for withdrawing gas under high pressure from said reservoir and for conveying said gas to a separator, means for cooling said gas in passage through said conduit and for expanding said gas into said separator, means for separately withdrawing condensate and uncondensed gas from said separator, means for recompressing said uncondensed gas to a higher pressure and for returning same to said reservoir, means for passing a liquefied gas refrigerant in liquid phase into indirect heat exchange with said condensed constituents, means for expanding said refrigerant in indirect heat exchange with said gas in said conduit, means for recompressing the vapors of the expanded refrigerant to re-liquefy same, a common power supply means for both said means for recompressing uncondensed gas and said vapors of the expanded refrigerant, and means for proportionally distributing the power from said power supply means to both the said recompressing means in accordance with the requirements of each.

WILLIAM H. VAUGHAN.